US010225685B2

(12) United States Patent
Lin et al.

(10) Patent No.: US 10,225,685 B2
(45) Date of Patent: Mar. 5, 2019

(54) METHOD FOR ASSISTING POSITIONING AND MOVABLE ELECTRONIC DEVICE THEREOF

(71) Applicants: Kinpo Electronics, Inc., New Taipei (TW); Cal-Comp Electronics & Communications Company Limited, New Taipei (TW)

(72) Inventors: Chuan-Kai Lin, New Taipei (TW); Yu-Lun Ting, New Taipei (TW)

(73) Assignees: Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/810,441

(22) Filed: Jul. 27, 2015

(65) Prior Publication Data

US 2016/0316321 A1 Oct. 27, 2016

(30) Foreign Application Priority Data

Apr. 21, 2015 (TW) .............................. 104112688 A

(51) Int. Cl.
*H04W 4/02* (2018.01)
*G01C 21/20* (2006.01)

(52) U.S. Cl.
CPC .............. *H04W 4/02* (2013.01); *G01C 21/20* (2013.01)

(58) Field of Classification Search
CPC ....................................................... H04W 4/02
USPC ........................................... 455/456.2, 456.1
See application file for complete search history.

(56) References Cited

U.S. PATENT DOCUMENTS

| 8,400,359 B2* | 3/2013 | Liu ....................... G01S 5/0289 |
| | | 342/463 |
| 2007/0093257 A1* | 4/2007 | McDougall ........... H04W 24/00 |
| | | 455/456.1 |
| 2010/0265134 A1 | 10/2010 | Yoshioka |

(Continued)

FOREIGN PATENT DOCUMENTS

| CN | 104135766 | 11/2014 |
| CN | 104168654 | 11/2014 |

(Continued)

OTHER PUBLICATIONS

"Office Action of Taiwan Counterpart Application", dated Feb. 17, 2016, p. 1-p. 8

(Continued)

*Primary Examiner* — Mazda Sabouri
(74) *Attorney, Agent, or Firm* — JCIPRNET

(57) ABSTRACT

A method for assisting positioning and a movable electronic device thereof are provided. The method is adapted to the movable electronic device moving within a region. In the method, the region is divided into multiple sub-regions. When the movable electronic device enters a first sub-region among the sub-regions, at least one wireless signal emitted by at least one signal emitting source is received by the movable electronic device, so as to calculate first location information associated with the first sub-region according to the at least one wireless signal. Then, a reliability of the first sub-region is generated and recorded according to a signal reception condition of the at least one wireless signal.

6 Claims, 4 Drawing Sheets

(56) References Cited

U.S. PATENT DOCUMENTS

| | | | | |
|---|---|---|---|---|
| 2011/0313662 A1* | 12/2011 | Huang | ............... | G01C 21/30 701/418 |
| 2012/0040697 A1* | 2/2012 | Park | ............... | H04W 4/02 455/457 |
| 2012/0059578 A1* | 3/2012 | Venkatraman | ......... | G01C 21/20 701/411 |
| 2012/0150440 A1* | 6/2012 | Sambongi | ............ | G01C 21/08 701/472 |
| 2014/0159952 A1* | 6/2014 | Fitzgerald | ............ | G01S 19/426 342/357.39 |
| 2014/0350850 A1* | 11/2014 | Kmiecik | ............ | G01C 21/005 701/487 |
| 2015/0373491 A1* | 12/2015 | Lim | ............... | G01S 5/0257 455/456.1 |
| 2016/0252350 A1* | 9/2016 | Wharton | ............... | H04W 4/02 701/25 |

FOREIGN PATENT DOCUMENTS

| | | |
|---|---|---|
| TW | 200712531 | 4/2007 |
| TW | 200928417 | 7/2009 |
| TW | 201423295 | 6/2014 |
| WO | 2014027248 | 2/2014 |

OTHER PUBLICATIONS

"Office Action of China Counterpart Application", dated Mar. 27, 2018, p. 1-p. 13.

Office Action of China Counterpart Application, dated Oct. 22, 2018, pp. 1-11.

* cited by examiner

METHOD FOR ASSISTING POSITIONING AND MOVABLE ELECTRONIC DEVICE THEREOF

CROSS-REFERENCE TO RELATED APPLICATION

This application claims the priority benefit of Taiwan application no. 104112688, filed on Apr. 21, 2015. The entirety of the above-mentioned patent application is hereby incorporated by reference herein and made a part of this specification.

TECHNICAL FIELD

The present disclosure relates a method for assisting positioning, and more particularly, to a method for assisting positioning that is capable of calculating a regional reliability and a movable electronic device thereof.

BACKGROUND

The purpose of research and development for a positioning navigation technology aims to estimate a location of a moving carrier during a moving process in actual environment, so as to achieve an accurate and stable navigation requirement of the moving carrier. As such, automatic guided vehicles nowadays are generally installed with a positioning module such as Global Position System (GPS) for outdoor usage or Indoor Global Position System (iGPS) for indoor usage. Theoretically, the positioning module should provide sufficient information that is accurate and stable for the autonomous mobile vehicles to complete their tasks, however, an accuracy and a reliability of the positioning information may be substantially reduced due to restrictions of the positioning module in nature or influences from external environment.

In recent years, besides the positioning module utilizing a wireless radio-frequency signal, the automatic guided vehicles may also be additionally installed with additional devices such as auxiliary positioning devices including an encoder, an electronic compass and the like, so as to increase the accuracy and the reliability for positioning. It has always been a research focus for researchers as how to integrate positioning information of those additional devices with the information generated by the wireless positioning device in order to generate the required location information.

Currently, a common integration method includes a mode switching method and a weight allocation method and the like. However, although various application examples have been proposed according to aforesaid methods, those methods cannot instantly response to changes in the environment to sufficiently use the positioning effect provided by said auxiliary devices because not all of states of the unknown environment can be obtained in advance. For instance, the wireless positioning module may not be able to perform the positioning accurately and stably in some specific regions due to blocking of obstacles or signal interference. In other words, it is now one of most concerned issues for person skilled in the art as how to develop a positioning method and a path planning navigation method for responding to the changes in the environment.

SUMMARY

Accordingly, the present disclosure is directed to a method for assisting positioning and a movable electronic device. The method divides a region where the movable electronic device moves into a plurality of sub-regions, and establishes a reliability of each of the sub-regions according to a signal reception condition of a wireless signal received by the movable electronic device within the sub-regions, so as to assist in positioning or path planning with reference to the reliability of each of the sub-regions.

The present disclosure provides a method for assisting positioning, which is adapted to the movable electronic device moving within a region. The method includes the following steps: dividing the region into a plurality of sub-regions; receiving at least one wireless signal emitted by at least one signal emitting source when the movable electronic device enters a first sub-region among the sub-regions so as to calculate first location information associated with the first sub-region according to the at least one wireless signal; and generating and recording a reliability of the first sub-region according to a signal reception condition of the at least one wireless signal.

From another perspective, the present disclosure further provides a movable electronic device. The movable electronic device is adapted to move within a region, and includes a wireless signal receiving unit, a storage unit and a processing unit. The storage unit stores a plurality of modules, and the processing unit is coupled to the wireless signal receiving unit and the storage unit and configured to access and execute the modules stored by the storage unit. The modules include a dividing module, a first positioning module and a reliability generating and recording module. The dividing module divides the region into a plurality of sub-regions. The first positioning module receives at least one wireless signal emitted by at least one signal emitting source by using the wireless signal receiving unit when the movable electronic device enters a first sub-region among the sub-regions so as to calculate first location information associated with the first sub-region according to the at least one wireless signal. The reliability generating and recording module generates and records a reliability of the first sub-region according to a signal reception condition of the at least one wireless signal.

Based on the above, according to the method for assisting positioning and the movable electronic device thereof, the method divides the region to which the movable electronic device can move into the multiple sub-regions, so as to generate the corresponding reliability for each of the sub-regions. The reliability of each of the sub-regions may be generated according to the signal reception condition of the wireless signal received by the movable electronic device within each of the sub-regions. Accordingly, after the reliability of each of the sub-regions within the region to which the movable electronic device moves is obtained, the moving path may be planed according to the reliability of each of the sub-regions, so as to avoid the regions with poor wireless signal reception. In addition, the movable electronic device may further calculate the second location information according to another positioning device so as to fuse the positioning information respectively estimated through different positioning manner according to the reliability of each of the sub-regions. As a result, besides improving the execution efficiency and the finish rate of the movable electronic device for the moving path, the positioning effect may be fully provided by the ancillary device in response to changes in the environmental.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
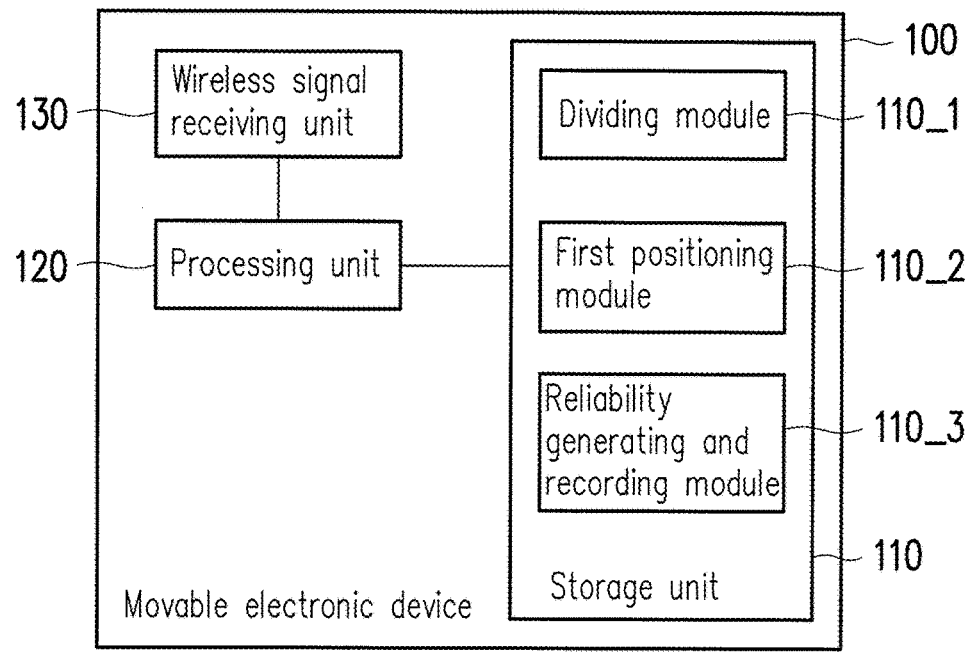
FIG. 1 illustrates a block diagram of a movable electronic device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates a block diagram of a movable electronic device according to an embodiment of the present disclosure. Referring to FIG. 1, a movable electronic device 100 includes a storage unit 110, a processing unit 120 and a wireless signal receiving unit 130. The movable electronic device 100 is, for example, an unmanned automatic guided vehicle, an autopilot vehicle and an automatic robot, or other similar movable electronic devices, but the present disclosure is not limited thereto. The storing unit 110 is, for example, a memory, a hard disk or other devices capable of storing data and recording a plurality of modules.

The processing unit 120 is coupled to the storage unit 110 and the wireless signal receiving unit 130. The processing unit 120 can be a processor for general purposes, a processor for special purposes, a conventional processor, a data signal processor, a plurality of microprocessors, one or more microprocessors, controllers, microcontrollers and Application Specific Integrated Circuit (ASIC) which are combined with a core of the digital signal processor, a Field Programmable Gate Array (FPGA), any other integrated circuits, a state machine, a processor based on Advanced RISC Machine (ARM) and similar products.

The wireless signal receiving unit 130 receives a wireless signal emitted by at least one signal emitting source, and the wireless signal receiving unit 130 includes an antenna or other elements capable of receiving the wireless signal. In the present embodiment, the signal emitting source may be disposed within a region inside which the movable electronic device 100 can move around, but the present disclosure is not limited thereto. In another embodiment, the signal emitting source may be disposed outside the region inside which the movable electronic device 100 can move around. The signal emitting source and the wireless receiving unit 130 are in compliance with the same wireless communication protocol, and said wireless communication protocol may be IEEE 802.11 standard, IEEE 802.15.4 standard, WiFi standard, Bluetooth standard or ZigBee wireless communication protocol standard, which are not particularly limited in the present disclosure.

In the present embodiment, the processing unit 120 is capable of accessing a dividing module 110_1, a first positioning module 110_2 and a reliability generating and recording module 110_3 which are stored by the storage unit 110, so as to perform each step of the method for assisting positioning as proposed according to an embodiment of the present disclosure.

Figure 2:
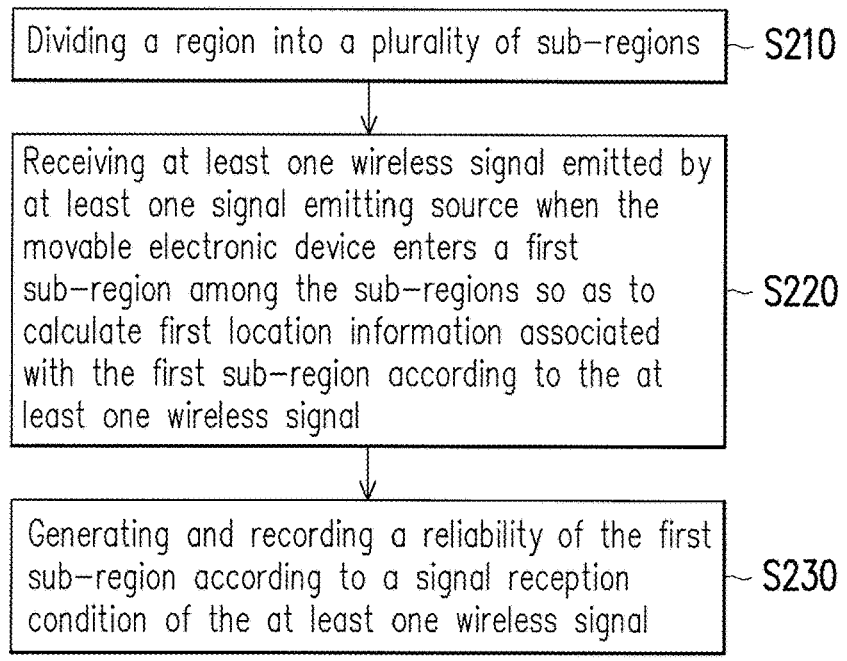
FIG. 2 illustrates a flowchart of a method for assisting positioning according to an embodiment of the present disclosure.

FIG. 2 illustrates a flowchart of a method for assisting positioning according to an embodiment of the present disclosure. The method proposed by the present embodiment is adapted to the movable electronic device 100 depicted in FIG. 1, and each step of the present embodiment is described in detail with reference to each element depicted in FIG. 1.

In step S210, the dividing module 110_1 divides the region to which the movable electronic device 100 can move into a plurality of sub-regions. In the present embodiment, the movable electronic device 100 divides the region into the sub-regions so as to facilitate in analyzing a positioning condition of the movable electronic device 100 within each of the sub-regions. However, a dimension and an amount of the sub-regions are not limited in the present disclosure, which may be decided according to practical requirements and applications. For instance, the dividing module 110_1 may divide the region to which the movable electronic device 100 moves into the sub-regions with the dimension of 30 cm×30 cm.

In step S220, the first positioning module 110_2 receives at least one wireless signal emitted by at least one signal emitting source by using the wireless signal receiving unit 150 when the movable electronic device 100 enters a first sub-region among the sub-regions so as to calculate first location information associated with the first sub-region according to the at least one wireless signal.

In the present embodiment, when the movable electronic device 100 enters the first sub-region among the sub-regions, the first positioning module 110_2 uses the wireless signal receiving module 130 to receive the wireless signal (e.g., a beacon, but the present disclosure is not limited thereto) emitted by the signal emitting source. Specifically, according to signal measurement parameters such as a signal strength or a signal arrived time of the wireless beacon received by the wireless signal receiving unit 130, the first positioning module 110_2 may calculate a distance or a relative orientation from the movable electronic device 100 to each signal emitting source. In this way, according to the distance or the relative orientation from the movable electronic device 100 to each signal emitting source, the first positioning module 110_2 may position for a coordinate (i.e., the first location information associated with the first sub-region) of the movable electronic device 100 within the region. For instance, the first positioning module 110_2 may calculate the coordinate of the movable electronic device 100 within the region by using a triangulation method, but the present disclosure is not limited thereto.

In step S230, the reliability generating and recording module 110_3 generates and records a reliability of the first sub-region according to a signal reception condition of the at least one wireless signal. Intuitively, the signal reception condition may be measurement parameters such as a wireless signal reception strength or a wireless signal receiving quality. Nonetheless, it can be known that, the signal reception condition of the wireless signal can influence a stability and an accuracy of the first positioning module 110_2 in terms of positioning. Therefore, in an embodiment, the signal reception condition of the wireless signal may also refer to a stability of the positioning information generated according to the wireless signal. Accordingly, the reliability of each of the sub-regions may be generated according to the signal reception condition of the wireless signal. When the reliability of the first sub-region is higher, a reliability of the first location information generated by the first positioning module 110_2 using the wireless signal for positioning is higher. In order to describe the execution actions of the reliability generating and recording module 110_3 in step S230 more clearly, step S230 is further divided into steps S310 to S340 as shown in FIG. 3 in the present disclosure.

Figure 3:
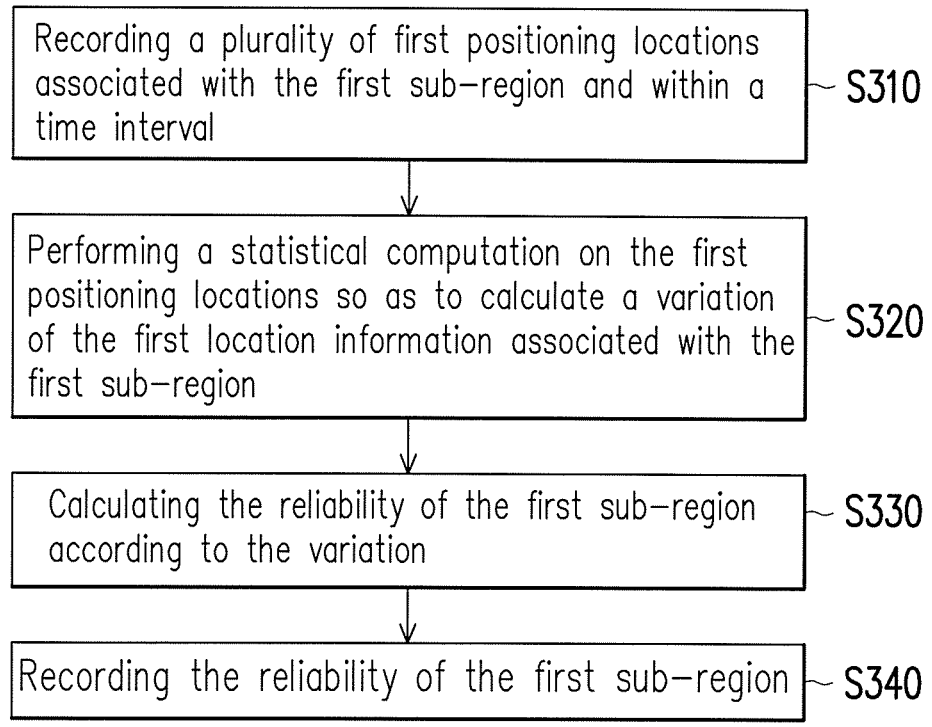
FIG. 3 illustrates an execution flowchart of the reliability generating and recording module of the movable electronic device according to an embodiment of the present disclosure.

FIG. 3 illustrates an execution flowchart of the reliability generating and recording module 110_3 of the movable electronic device 100 according to an embodiment of the present disclosure. In step S310, the reliability generating and recording module 110_3 records a plurality of first positioning locations associated with the first sub-region and within a time interval.

In the present embodiment, when the movable electronic device 100 enters the first sub-region, the movable electronic device 100 may receive a plurality of beacon signals periodically emitted by each signal emitting source, so as to use to periodically perform the positioning action by using the first positioning module 110_2. In other words, the movable electronic device 100 is capable of periodically positioning for a plurality of first positioning locations with respect to different time points by using the wireless signals received with respect to the different time points.

It should be noted that, take the movable electronic device 100 is in a resting state within a time interval for example, in an ideal situation, since the movable electronic device 100 is located at the same location in the region within said time interval, the multiple first positioning locations estimated by the first positioning module 110_2 within said time interval should be the same or have only a slight difference from one another. However, in the actual situation, the wireless signals received by the movable electronic device 100 may be influenced by various environmental factors (e.g., influenced by new obstacles or by other signal emitting sources). In the case where the signal reception condition is poor because the wireless signals are seriously influenced, even if the movable electronic device 100 is in the resting state within a time interval, the first positioning locations estimated by the first positioning module 110_2 within the time interval may include obvious differences and variations. On the other hand, when the movable electronic device 100 is in a moving state, because the estimating time points respectively corresponding to the first positioning locations are quite close to each other, the first positioning locations estimated by the first positioning module 110_2 may be close to each other as well or may show a simple linear relationship.

Thus, the reliability generating and recording module 110_3 records a plurality of first positioning locations associated with the first sub-region. In step S320, the reliability generating and recording module 110_3 performs a statistical computation on the first positioning locations so as to calculate a variation of the first location information associated with the first sub-region. More specifically, by performing the statistical computation on the first positioning locations, the reliability generating and recording module 110_3 may determine a variation degree of each of the first positioning locations from the others. For instance, the reliability generating and recording module 110_3 may first calculate an average value of the first positioning locations, and then calculate the variation associated with the first positioning locations according to the average value. In another embodiment, the reliability generating and recording module 110_3 may first obtain an approximation linear equation according to the first positioning locations, and then calculate the variation associate with the first positioning locations according to the approximation linear equation. In other words, the reliability generating and recording module 110_3 may calculate a difference degree of each of the first positioning locations from the other and associate the difference degree to the first sub-region, so as to obtain the variation of the first location information associated with the first sub-region.

In step S330, the reliability generating and recording module 110_3 calculates the reliability of the first sub-region according to the variation. In step S340, the reliability generating and recording module 110_3 records the reliability of the first sub-region.

In the present embodiment, when the difference of each of the first positioning locations from the others is less, the variation of the first location information associated with the first subs-region is also less, and thus the obtained first positioning locations are closer to one another. Therefore, when the variation of the first location information of the movable electronic device 100 within the first sub-region is less, a positioning result obtained by the movable electronic device 100 is more clear and more correct, and thus the reliability of positioning the movable electronic device 100 by using the wireless signal within the first sub-region can be determined as higher. On the other hand, when the variation of the first location information of the movable electronic device 100 within the first sub-region is greater, a positioning result obtained by the movable electronic device 100 is less clear and less correct, and thus the reliability of positioning the movable electronic device 100 by using the wireless signal within the first sub-region can be determined as lower. Thereafter, the reliability generating and recording module 110_3 records the reliability associated with the first sub-region. Specifically, in an embodiment, after the movable electronic device 100 enters the first sub-region, the movable electronic device 100 may set the reliability of the first sub-region by a look-up table together with the variation associated with the first sub-region. Alternatively, in another embodiment, the reliability of each of the sub-regions may be set to a preset value, so that after the movable electronic device 100 enters the first sub-region, the movable electronic device 100 may raise or lower the reliability of the first sub-region according to the variation associated with the first sub-region.

It should be noted that, besides steps S310 to S340, the reliability generating and recording module 110_3 may also analyze and record the reliability by using other methods. For example, in another embodiment of the present disclosure, the execution action of the reliability generating and recording module 110_3 in step S230 is further divided into step S410 to S430 as shown in FIG. 4.

Figure 4:
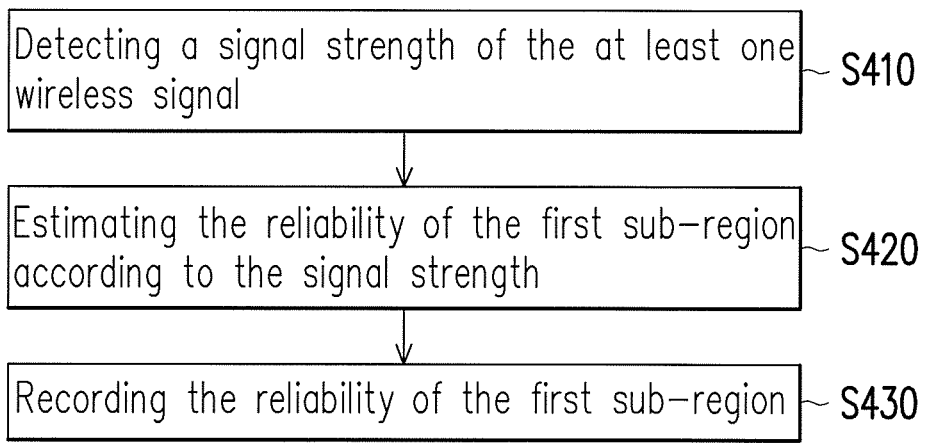
FIG. 4 illustrates an execution flowchart of the reliability generating and recording module of the movable electronic device according to another embodiment of the present disclosure.

FIG. 4 illustrates an execution flowchart of the reliability generating and recording module 110_3 of the movable electronic device 100 according to another embodiment of the present disclosure. Unlike the foregoing embodiment, in step S410, the reliability generating and recording module 110_3 detects a signal strength of the at least one wireless signal.

In the present embodiment, when the movable electronic device 100 enters the first sub-region among the sub-regions, the wireless signals emitted by the signal emitting sources at different locations may also be received. Within a time interval, the movable electronic device 100 may detect the wireless signals with different signal strengths based on different time points and locations. Herein, as mentioned in the foregoing embodiment, the wireless signals received by the movable electronic device 100 may be influenced by various environmental factors (e.g., influenced by new obstacle or by other signal emitting sources) such that the wireless signals corresponding to different receiving timing with different strengths may be detected. The reliability generating and recording module 110_3 accordingly records a plurality of wireless signal strengths associated with the first sub-region.

As such, in step S420, the reliability generating and recording module 110_3 may estimate the reliability of the first sub-region according to the signal strength. In step S430, the reliability generating and recording module 110_3 records the reliability of the first sub-region.

In the present embodiment, the reliability generating and recording module 110_3 estimates the reliability associated with the first sub-region according to the signal strengths of the wireless signals received by the movable electronic device 100 within the first sub-region. When the wireless signal strengths received by the movable electronic device 100 is stronger, it indicates that the reliability of the positioning result obtained by using the wireless signals by the first positioning module 110_2 is higher. It can be known that, when the movable electronic device 100 enters a signal reception dead zone, the wireless signal strengths detected by the movable electronic device 100 become extremely weak, and it is also possible that the wireless signals cannot be detected at all. In this case, the accuracy and the stability of the first location information calculated by the first positioning module 110_2 using the wireless signals may provide a poor performance. Accordingly, in the present embodiment, the reliability generating and recording module 110_3 sets the reliability for each of the sub-regions respectively according to the wireless signal strengths of the wireless signals received by the movable electronic device 100 within each of the sub-regions. Similarly, the reliability generating and recording module 110_3 also records the reliability associated with the first sub-region.

Accordingly, by repeatedly performing steps S210 to S230, for those sub-regions where the movable electronic device 100 used to move pass by, the corresponding variations and the signal reception strength are recorded and the reliabilities are updated at the same time. Naturally, it is also possible that the movable electronic device 100 may pass one specific sub-region for multiple times, and the actions of estimating and updating the reliability are performed each time when the movable electronic device 100 passes the specific sub-region. It should be noted that, the calculated variation or the detected signal strengths may change each time due to the changes in the environmental factors. Nonetheless, each time when the movable electronic device 100 enters the first sub-region, the calculated variation and the detected signal strengths may be used to update the reliability of the first sub-region.

It is worth mentioning that, the movable electronic device 100 may plan a moving path of the movable electronic device 100 according to the reliability. In brief, when the movable electronic device 100 plans the moving path, the moving path may also be selected properly according to the reliability of each of the sub-regions. In addition, besides using the wireless signal for positioning, the movable electronic device 100 may also use other positioning devices for positioning, and the reliability may also be used as reference for selecting or integrating the positioning information generated by using the wireless signal and the positioning information generated by using the other positioning devices. Another embodiment is provided for detailed illustration below.

Figure 5:
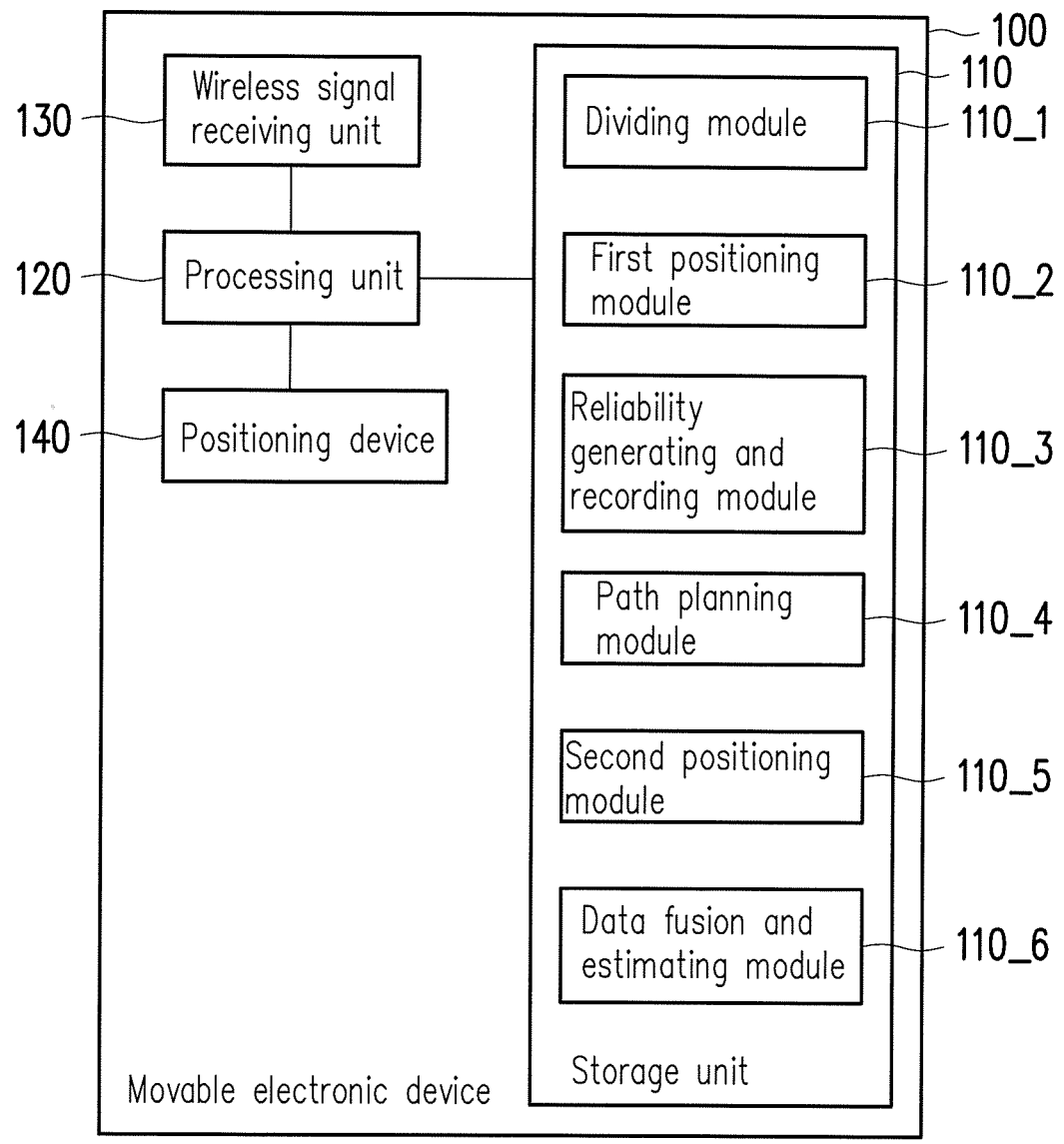
FIG. 5 illustrates a block diagram of a movable electronic device according to another embodiment of the present disclosure.

FIG. 5 illustrates a block diagram of a movable electronic device according to another embodiment of the present disclosure. Referring to FIG. 5, in the present embodiment, the movable electronic device 100 further includes a positioning device 140, and the storage unit further includes a path planning module 110_4, a second positioning module 110_5 and a data fusion and estimating module 110_6. Therefore, the movable electronic device 100 may plan the moving path of the movable electronic device 100 through the path planning module 110_4 according to the reliability of each of the sub-regions within the region. Accordingly, besides avoiding physical obstacles within the region, the movable electronic device 100 may also select to avoid the sub-region with the reliability that is relatively poor, so as to improve a performance efficiency and a finish rate of the movable electronic device 100 for the moving path.

On the other hand, besides calculating the first location information associated with the first sub-region by receiving the at least one wireless signal emitted by the at least one signal emitting source, the movable electronic device 100 may also calculate second location information associated with the first sub-region through the positioning device 140. Accordingly, the movable electronic device 100 is capable of combining the first location information and the second location information which are obtained respectively by two different positioning methods, so as to generate an estimated location for determining an exact coordinate of the movable electronic device 100.

Furthermore, the positioning device 140 is coupled to the processing unit 120. In the present embodiment, the positioning device 140 is, for example, an encoder, an electronic compass, a gyro or other similar devices, but the present disclosure is not limited thereto. The positioning device 140 may use its own detecting method or the respective positioning method for positioning. For instance, the encoder may be used to measure for speed information of wheels disposed on the movable electronic device 100, so that the processing unit 120 may use the speed information (e.g., a difference between rotation speeds of different wheels) for positioning. In other words, the processing unit 120 may use the positioning device 140 and the second positioning module 110_5 stored by the storage unit 110 for positioning in order to obtain the second location information, and the data fusion and estimating module 110_6 may integrate the first location information and the second location information obtained respectively by the two different positioning methods so as to estimate the estimated location of the movable electronic device 100.

Figure 6:
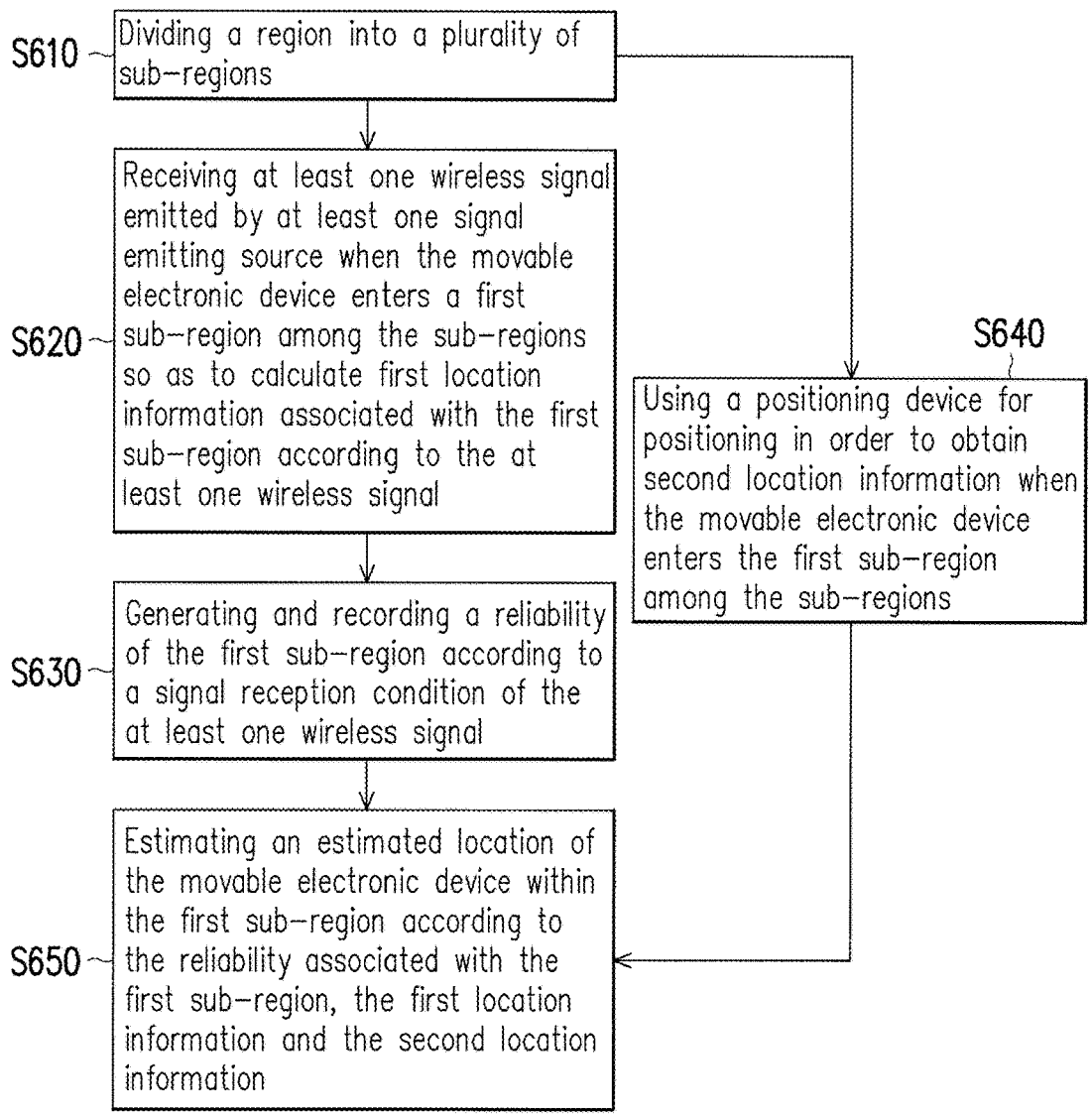
FIG. 6 illustrates a flowchart of a method for assisting positioning according to another embodiment of the present disclosure.

Referring to FIG. 6, FIG. 6 illustrates a flowchart of a method for assisting positioning according to another embodiment of the present disclosure. Calculating method for the first location information and the reliability in steps S610 to S630 are similar or identical to those in steps S210 to S230, which are not repeated hereinafter. Unlike the foregoing embodiment, in step S640, the second positioning module 110_5 uses the positioning device 140 for positioning in order to obtain second location information when the movable electronic device enters the first sub-region among the sub-regions. In step S650, the data fusion and estimating module 110_6 estimates an estimated location of the movable electronic device 100 within the first sub-region according to the reliability associated with the first sub-region, the first location information and the second location information.

Figure 7:
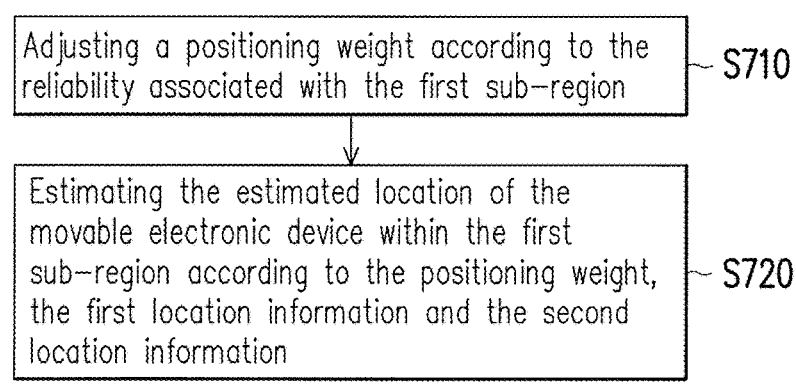
FIG. 7 illustrates an execution flowchart of the data fusion and estimating module of the movable electronic device according to an embodiment of the present disclosure.

In order to describe the execution actions of the data fusion and estimating module 110_6 in step S650 more clearly, step S650 is further divided into steps S710 to S720 as shown in FIG. 7 in the present disclosure.

FIG. 7 illustrates an execution flowchart of the data fusion and estimating module 110_6 of the movable electronic device 100 according to an embodiment of the present disclosure. In step S710, the data fusion and estimating module 110_6 adjusts a positioning weight according to the reliability associated with the first sub-region. In step S720, the data fusion and estimating module 110_6 estimates the estimated location of the movable electronic device within the first sub-region according to the positioning weight, the first location information and the second location information.

In the present embodiment, a mechanism for combining the first location information and the second location infatuation is, for example, to first determine the positioning weight corresponding to the first location information and then generate the estimated location by linearly combining the first location information and the second location information according to the positioning weight. The positioning weight may be regarded as a control gain, and such control gain may reflect gravities of the first location information and the second location information for determining the estimated location, wherein a range of the control gain falls between 0 and 1.

Specifically, when the reliability associated with the first sub-region is higher, it indicates that the first location information of the movable electronic device 100 is more accurate. In this case, a size of the positioning weight may be increased to increase the gravity of the first location information for determining the estimated location. Otherwise, when the reliability associated with the first sub-region is lower, it indicates that the wireless signal received by the movable electronic device 100 within the first sub-region is less stable. In other words, additional devices are required to obtain the second location information associated with the first sub-region so as to further ensure the estimated location of the movable electronic device 100. Accordingly, the data fusion and estimating module 110_6 may reduce the size of the positioning weight so as to reduce the gravity of the first location information for determining the estimated location. Thereafter, the data fusion and estimating module 110_6 may sum up the first location information multiplied by a positioning weight (w) and the second location information multiplied by another positioning weight (1-w) in order to generate the estimated location, but possible implementations of the present disclosure are not limited thereto. It should be noted that, if the reliability associated with the first sub-region is less than a threshold, the second location information may be directly used as the estimated location. Herein, the threshold may be set based on demand, and the present disclosure is not limited thereto.

In summary, according to the method for assisting positioning and the movable electronic device thereof, the method divides the region to which the movable electronic device can move into the multiple sub-regions, so as to generate the corresponding reliability for each of the sub-regions. The reliability of each of the sub-regions may be generated according to the signal reception condition of the wireless signal received by the movable electronic device within each of the sub-regions. Accordingly, after the reliability of each of the sub-regions within the region to which the movable electronic device moves is obtained, the moving path may be planed according to the reliability of each of the sub-regions, so as to avoid the regions with poor wireless signal reception. In addition, the movable electronic device may further calculate the second location information according to another positioning device so as to integrate the positioning information estimated through different positioning information according to the reliability of each of the sub-regions. As a result, besides improving the execution efficiency and the finish rate of the movable electronic device for the moving path, the positioning effect may be fully provided by the ancillary device in response to changes in the environmental.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for assisting positioning, adapted to a movable electronic device moving within a region, comprising:
   (a) dividing the region into a plurality of sub-regions;
   (b) receiving at least one wireless signal emitted by at least one signal emitting source when the movable electronic device enters one of the sub-regions so as to calculate first location information associated with a first sub-region according to the at least one wireless signal, and
   generating and recording a reliability of the first sub-region according to a signal reception condition of the at least one wireless signal;
   (c) repeating the step (b), to generate and record at least one another reliability of at least one another first sub-region among the sub-regions;
   (d) planning and selecting one of the sub-regions a moving path in the region for the movable electronic device according to the reliability generated in the step (b) and the at least one another reliability generated in the step (c) and planning a moving path according to the selected one of the sub-regions in the region for the movable electronic device to move along; and
   (e) using a positioning device for positioning in order to obtain second location information when the movable electronic device enters the first sub-region among the sub-regions; and
   estimating an estimated location of the movable electronic device within the first sub-region according to the reliability associated with the first sub-region, the first location information and the second location information, comprising:
      using the second location information as the estimated location if the reliability associated with the first sub-region is less than a threshold.

2. The method for assisting positioning of claim 1, wherein the step (b) comprises:
   recording a plurality of first positioning locations associated with the first sub-region and within a time interval;
   performing a statistical computation on the first positioning locations so as to calculate a variation of the first location information associated with the first sub-region;
   calculating the reliability of the first sub-region according to the variation; and
   recording the reliability of the first sub-region.

3. The method for assisting positioning of claim 1, wherein the step (b) comprises:
   detecting a signal strength of the at least one wireless signal;
   estimating the reliability of the first sub-region according to the signal strength; and
   recording the reliability of the first sub-region.

4. The method for assisting positioning of claim 1, wherein after the step (b), the method further comprises:
   updating the reliability when the movable electronic device enters the first sub-region among the sub-regions again.

5. The method for assisting positioning of claim 1, wherein the step of estimating the estimated location of the movable electronic device within the first sub-region according to the reliability associated with the first sub-region, the first location information and the second location information comprises:
   adjusting a positioning weight according to the reliability associated with the first sub-region; and
   estimating the estimated location of the movable electronic device within the first sub-region according to the positioning weight, the first location information and the second location information.

6. A movable electronic device, adapted to move within a region, comprising:
   a wireless signal receiving unit;
   a storage unit, storing a plurality of modules;
   a positioning device; and
   a processing unit, coupled to the wireless signal receiving unit, the storage unit, and the positioning device, and configured to access and execute the modules stored by the storage unit, wherein the processing unit is configured for executing following steps:
   (a) dividing the region into a plurality of sub-regions;
   (b) receiving at least one wireless signal emitted by at least one signal emitting source by using the wireless signal receiving unit when the movable electronic device enters one of the sub-regions so as to calculate first location information associated with a first sub-region according to the at least one wireless signal, and generating and recording a reliability of the first sub-region according to a signal reception condition of the at least one wireless signal;
   (c) repeating the step (b), to generate and record at least one another reliability of at least one another first sub-region among the sub-regions;
   (d) planning and selecting one of the sub-regions a moving path in the region for the movable electronic device according to the reliability generated in the step (b) and the at least one another reliability generated in the step (c) and planning a moving path according to the selected one of the sub-regions in the region for the movable electronic device to move along; and
   (e) using the positioning device for positioning in order to obtain second location information; and
   estimating an estimated location of the movable electronic device within the first sub-region according to the reliability associated with the first sub-region, the first location information and the second location information, comprising:
   using the second location information as the estimated location if the reliability associated with the first sub-region is less than a threshold.

* * * * *